UNITED STATES PATENT OFFICE.

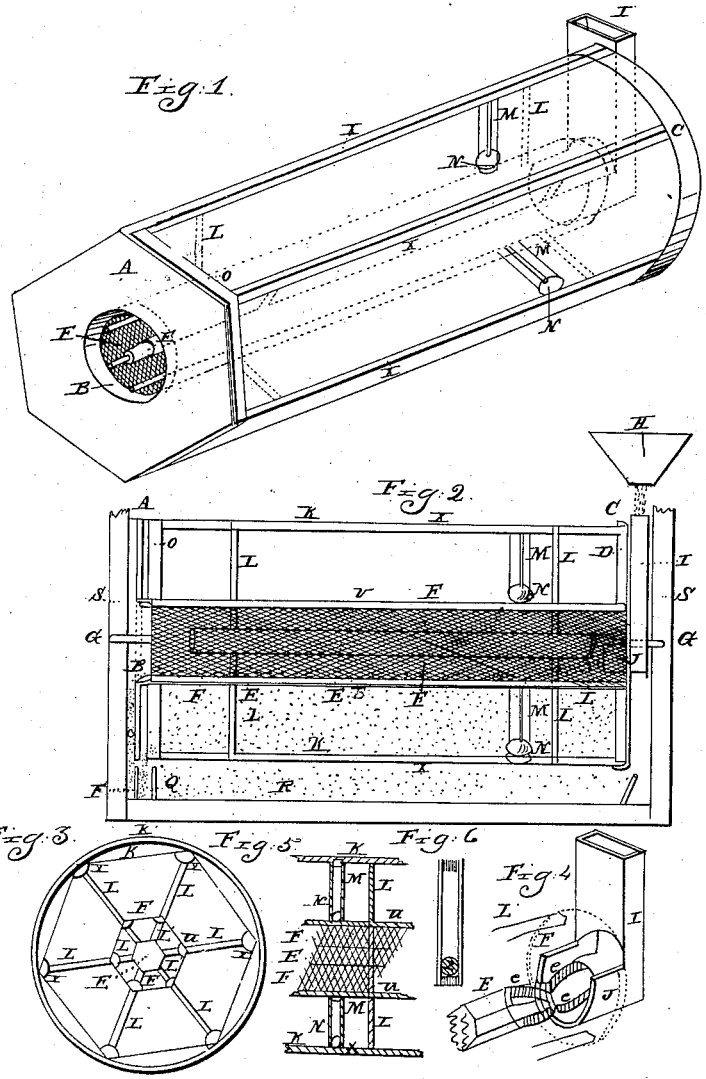

WILLIAM McKAIN, OF CONOY, PENNSYLVANIA.

IMPROVEMENT IN MODE OF PREVENTING DESTRUCTION OF BOLTING-CLOTHS IN FLOURING AND GRIST MILLS.

Specification forming part of Letters Patent No. 34,002, dated December 24, 1861.

*To all whom it may concern:*

Be it known that I, WILLIAM McKAIN, of Conoy township, in the county of Lancaster and State of Pennsylvania, have invented a new and improved mode for preventing meal-bugs or beetles and other insects getting within the reel or bolters used for sifting meal in mills, thereby protecting the bolting-cloth (an expensive fabric) to which they are so destructive, as the insects usually gnaw their way out through the cloth; and I do hereby declare that the following is a full and exact description thereof, reference being had to the accompanying drawings, and to the letters of reference marked thereon.

Figure 1 is a perspective view of the reel or bolter with its feeding-spout, &c. Fig. 2 is a longitudinal section, and Fig. 3 a cross-section of the same; Fig. 4, the feeding-spout and end of the shaft. Fig. 5 shows the tubes containing the knockers, represented on the model by a ball and rod.

The nature of my invention consists in surrounding the shaft of the reel or bolter with a wire screen (made, say, fourteen to sixteen meshes to the inch.) This screen is connected with the tail end or tin-plate head A by a flange B, in order to admit of a space between said plate A and the outside end of the reel or bolter, so that the middlings may work out in the usual way when the tail end is altogether open. The head C or other end of the reel is also closed by a tin-plate cap. The feeding-spout I has an open elbow J entering the wire screen, and in which elbow the flights or wings e on the end of the shaft feed the meal into the screen, Fig. 4, there being no connection between the screen and bolting-cloth but through the meshes of the screen. Consequently beetles or other insects are confined within the screen or make their way out at the tail end over the flange B into P. The hard and smooth surface of the tin plates and their connection with the screen effectually prevents such destructive insects of getting inside the reel or cloth where the damage is usually done by them.

To prevent the clogging of the flour, knockers are employed by sliding on rods; but as these are also subject to clogging in like manner I use a tin tube M, Fig. 5, set over plugs on the ribs X of the reel K and the ribs V of the screen F. Within said tube I place a ball N of any desired weight or material, being protected from coming in contact with the flour within the bolter, and in the revolutions of the reel alternately striking the plugs on the screen and bolter.

I am aware that sliding knockers are in use, sliding upon rods, and that there is no novelty in the reel or shaft, though I am not aware that flights have been employed for feeding from the spout, but I do not claim either of these parts, separately considered.

What I claim as my invention, and desire to secure by Letters Patent, is—

The combination of the tin-plate heads A and C by the flange B with the wire screen F, the rolling tubular knockers M N, and arrangement of the winged shaft with the feeding-spout I J, substantially as set forth, for the purpose specified.

WM. McKAIN.

Witnesses:
GEO. SANDERSON,
JACOB STAUFFER.